March 24, 1970     SADATOMO KURIBAYASHI     3,502,213
STRAINER
Filed Feb. 15, 1968     3 Sheets-Sheet 1
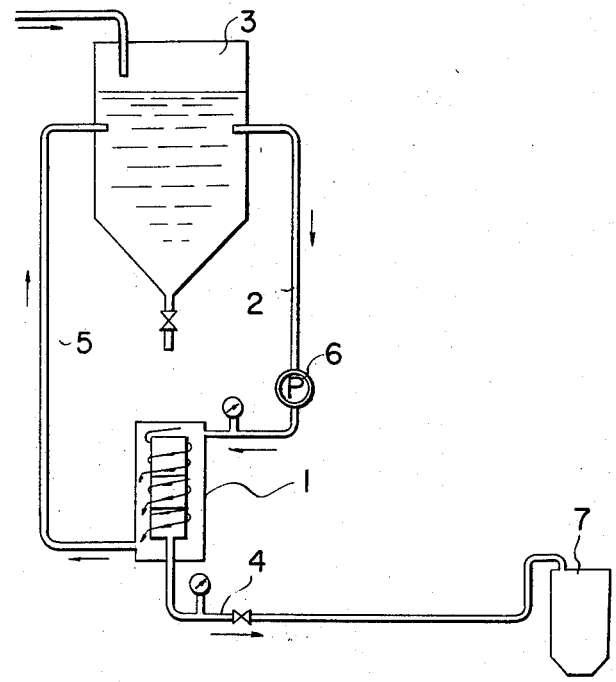
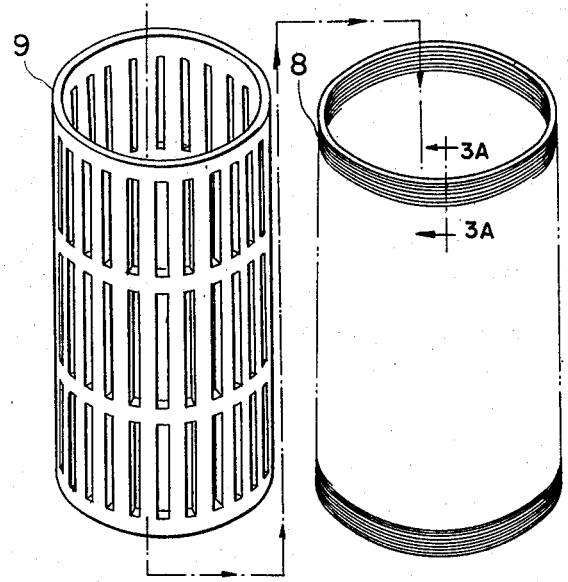
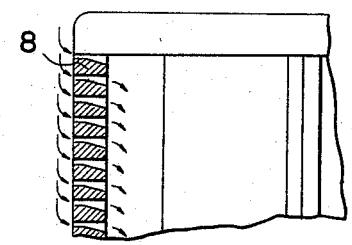
INVENTOR
SADATOMO KURIBAYASHI

INVENTOR
SADATOMO KURIBAYASHI

United States Patent Office 3,502,213
Patented Mar. 24, 1970

3,502,213
STRAINER
Sadatomo Kuribayashi, 11–21 2-chome, Kakinokizaka, Meguro-ku, Tokyo, Japan
Filed Feb. 15, 1968, Ser. No. 705,710
Claims priority, application Japan, Apr. 15, 1967, 42/23,729
Int. Cl. B01d 27/12
U.S. Cl. 210—108                                7 Claims

ABSTRACT OF THE DISCLOSURE

A strainer screening element of stainless steel notched wire is doubly protected for foreign matter. In a first step, one part of fluid introduced into the strainer is caused to move around the screening element along a helical passage without being filtered so as to wash off any collected foreign matter. In a second step, the matter is blown off by pneumatic pressure which is introduced into the strainer reversely through a filtrate delivery conduit. Blowing is automatically controlled by means of a pressure differential switch, a controller and electromagnetic valves. Thus the screening element is doubly protected from dirt or foreign matter by means of one portion of fluid intended to be filtered and a pneumatic blowing device.

Background of the invention

In the prior art strainers, a total amount of fluid intended to be filtered is caused to pass fully through the mesh of the screen element, and any dirt or foreign matter having a size greater than that of the mesh of the screen is held by the screen and hence will cause the latter to become clogged easily. The deposited dirt or foreign matter cannot be removed without removing the screen element from the strainer casing and washing it. Frequent washing of the screen element is of course troublesome, and will necessitate the use of a number of stand-by units and moreover, centrifugal purifiers when in service. The present invention is devised to overcome the above-mentioned difficulties of the conventional strainer.

Summary of the invention

In the strainer according to the present invention, one part, for instance, one-third to one-fourth, of the fluid fed into the strainer is caused to flow around a cylindrical screen element so as to wash the dirt or foreign matter from the surface of the screen element, and then returned to the supply source of that fluid without passing through the mesh of the screen, and only the other or remaining part of the fluid fed into the strainer will pass through the mesh of the strainer. Since all the surfaces of the screen element are washed at all times by means of the flowing fluid, they are free from any deposits which would otherwise clog the mesh of the screen.

However, the strainer, which is provided with washing means according to the present invention, may become clogged after a period of time. A blowing means is connected to the filtrate conduit from the strainer so as to blow the deposited dirt from the surface of the screen element by means of a pneumatic pressure introduced into the strainer. Further, means are provided for automatically operating the blowing means when a pressure differential between the pressure of fluid fed into the strainer and that of the filtrate coming therefrom reaches a predetermined value, that is, the screen element is clogged to a predetermined degree.

According to the present invention, the strainer comprises housing means provided with a fluid supply, a fluid discharge and a filtrate delivery conduit respectively, a filter means connected to said delivery conduit and accommodated within said housing means and including a screening element of cylindrical shape and a guide member surrounding said screening element and having guide vanes disposed thereon and positioned to induce a helical flow of fluid around said screening element, thereby causing at least one portion of the fluid supplied into the strainer to be moved around said screening element, and a pneumatic blowing means connected to said fluid supply and filtrate delivery conduits and automatically operated by a pressure differential between said fluid supplying and said filtrate delivery conduit for cleaning said filter means.

Brief description of drawing figures

FIG. 1 is a schematic view showing the arrangement of the strainer according to the present invention including various pipings connected thereto and a reservoir for the fluid;

FIG. 3 is an enlarged perspective view showing the screening element and the framework inserted therein;

FIG. 3A is a vertical section view taken along line 3A—3A in FIG. 3, and

Detailed description of the invention

Figure 2:
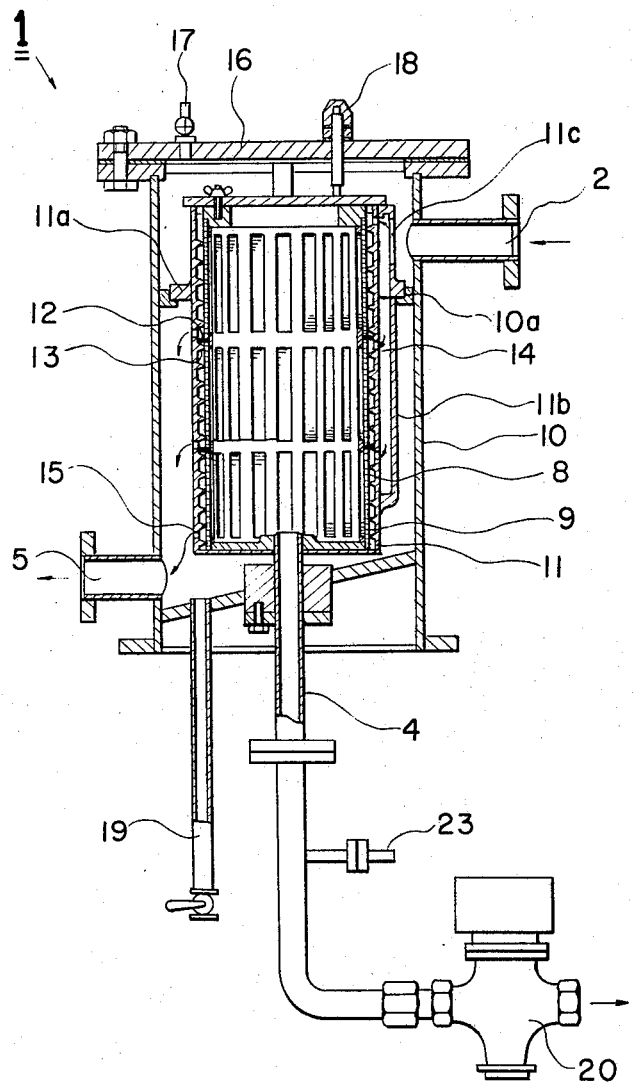
FIG. 2 is a vertical section taken through the strainer per se.

Referring to drawings, particularly FIG. 1, there is shown a strainer 1 located at a level lower than that of a reservoir or settling tank 3 containing the fluid to be filtered. The strainer 1 is connected to the reservoir 3 by means of a supply conduit 2 having a supply pump 6 connected therein and a return conduit 5, so as to have at least one part of the fluid in the strainer 1 returned to the reservoir 3, thus forming a fluid conducting circuit from the tank 3 through the conduit 2, the strainer 1 and the conduit 5 again to the reservoir 3. Filtered fluid is delivered from the strainer 1 through a filtrate pipe 4 to the filtrate or service tank 7.

As shown in FIG. 2, the strainer 1 comprises a cylindrical housing or casing 10 and a cylindrical screening element 8 surrounding and braced by a foraminous frame 9 and loosely encased within a guide member 11, which is in turn accommodated concentrically within the housing 10.

The screening element 8 per se includes a notched wire of stainless steel helically coiled as shown in FIG. 3, so as to produce a gap of 10–100 microns between adjacent loops of the coil. FIG. 3A shows in section a number of loops stacked so as to produce fluid passages for the screening purpose. These passages are designed to avoid having dirt and foreign matter collected thereon. This screening element itself is conventional and does not form a part of this invention.

The cylindrical guide member 11 has a radially disposed peripheral flange 11a sealingly in contact with an annular retainer ring 10a of the housing 10 and retained by a hold-down bolt 18 extending through the top cover 16 of the housing 10. The guide member 11 is provided with an inlet manifold 11b which has in its upper portion a number of wide openings 11c for receiving incoming fluid from the conduit 2. The space between the element 8 and the guide member 11 is separated axially into several, for instance three in FIG. 2, sections by means of a number of partitions 12. A helical guide fin 13 is provided on the guide member 11 in each of the above-mentioned sections, so as to provide a helical passage for the fluid introduced into the guide member. At least one inlet 14 and output opening 15 respectively are provided in each section of the guide member 11. A filtrate pipe 4 is connected to the guide member 11 at the bottom thereof and passes through the bottom plate of the housing 10, so as to deliver the filtrate fluid into the filtrate or service tank 7. A vent cock 17 is provided in the cover 16 and a drain cock 19 is connected to the bottom member of the housing 10.

Figure 4:
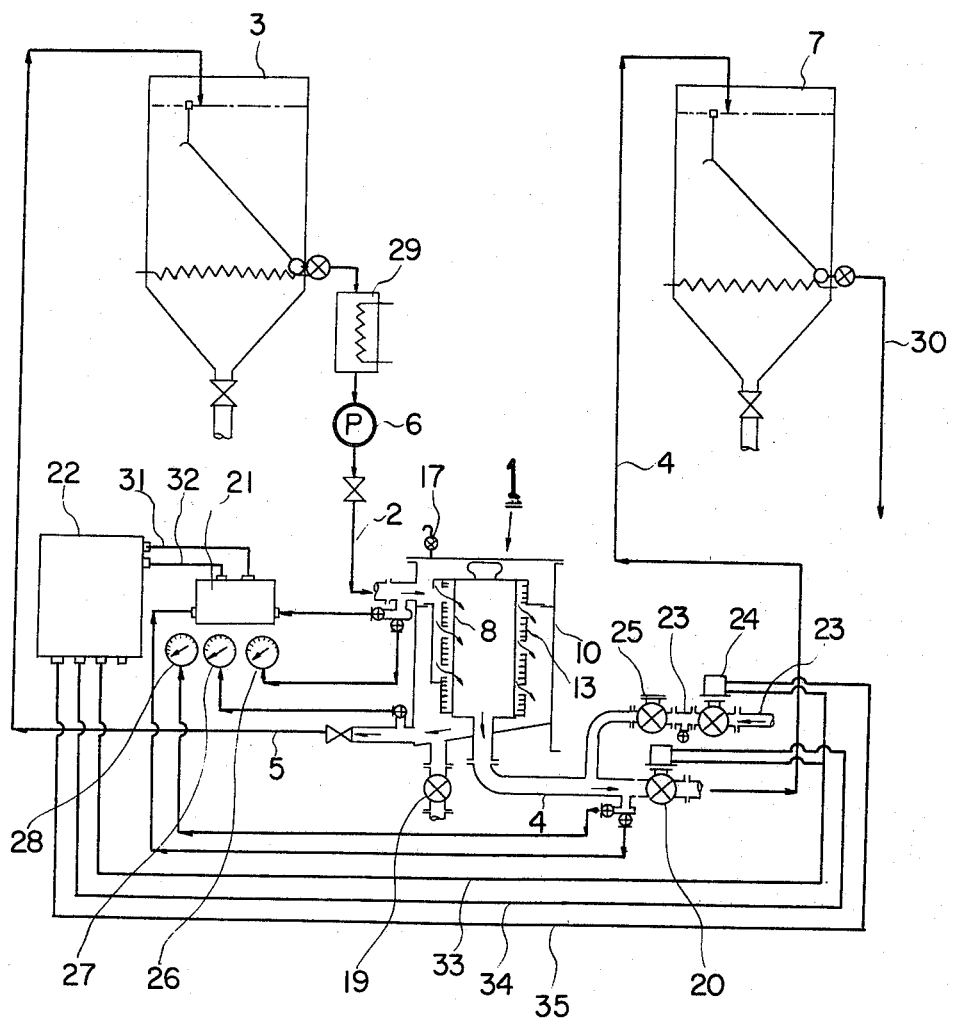
FIG. 4 is a schematic view showing the strainer according to the present invention having a pneumatic blowing means connected thereto.

FIG. 4 shows an automatic blowing means according to the present invention associated with the strainer 1. A branch pipe 23 is connected between the filtrate pipe 4 and a suitable source of pneumatic pressure (not shown). A check valve 25 and an electromagnetic valve 24 are provided in the branch or air pipe 23. An electromagnetic valve 20 is connected to the filtrate pipe 4. A differential pressure switch 21 located separately from the strainer 1 has its one side connected to the fluid supply pipe 2 and the other side connected to the filtrate pipe 4 by means of suitable tubes, and is provided with a diaphragm (not shown) connected to a switch adapted to close a control circuit for both electromagnetic valves when the pressure differential between the fluid supply pipe 2 and the filtrate pipe 4 attains a predetermined value.

An electric controller 22 is connected to the pressure switch 21 by suitable conductors 31, 32 and to the electromagnetic valves 20 and 24 respectively by conductors 33, 34 and 33, 35. Pressure gauges 26, 27 and 28 are mounted respectively on the fluid supply line 2, the fluid returning line 5 and the filtrate line 4. A fluid heating device 29 is inserted into the fluid supply pipe 2, a delivery pipe 30 is connected to the filtrate or service tank 7 for supplying the filtered fluid to an engine or some other usage.

In operation, the fluids containing dirt and foreign matter is supplied from the reservoir or settling tank 3 through the conduit 2 to the inlet manifold 11b of the strainer 1 by means of a supply pump 6. The fluid introduced into the manifold 11b enters the space between the screen element 8 and the guide member 11 through a plurality of inlet openings 14, which space is separated into a number of sections as described hereinabove. Then, at least one part of the fluid will be moved helically along the guide vanes 13 and discharged through the outlet openings 15 in each section while washing off the surface of the screen element 8, and then returned again to the reservoir or settling tank 3. The other or remaining part of the fluids will pass through the mesh of the screen element 8, leaving the dirt and foreign matter behind, and pass into the filtrate pipe 4. Since the surface of the screen element 8 is washed off at all times by means of one part of the fluid supplied into the strainer, there will be no dirt nor foreign matter adhering to the mesh of the screen element, that is, the screen element will not become clogged.

Since the space between the screening element 8 and the guide member 11 is divided into several sections, the screening element 8 can be used uniformly throughout its height, and the length of the fluid passage may be reduced thereby reducing a loss of head of the fluid and hence the power for transferring the fluid.

Since the fluid is caused to flow circumferentially of the filtering element, foreign matter of considerable size will be maintained away from the filtering element due to centrifugal force, thereby reducing the possibilities for the foreign matter to block the mesh of the screen element 8.

However, the screen element 8 may be sometimes clogged after long service, dependent upon quality of the fluid. If the screen element 8 becomes clogged, there must be a considerable amount of pressure differential between the fluid in the supply conduit 2 and that in the filtrate conduit 4. The differential switch 21 is set beforehand to close the control circuit when the above-mentioned pressure differential attains a predetermined value. When the control circuit is closed, the controller 22 will energize first the field coil of the electromagnetic valve 20 on the filtrate pipe 4 so as to close the valve, and then after a predetermined period of time, energize the field coil of the electromagnetic valve 24 on the pneumatic pressure pipe line 23 so as to supply air under pressure to blow off the dirt and foreign matter from the screen element 8 into the helical passage between guide fins 13 when they are carried away.

When the element 8 is cleaned in this manner, the fluid will normally go into the filtrate pipe 4 through the element 8, thereby reducing the pressure differencial between the supply pipe 2 and the filtrate pipe 4 below the predetermined value so as to close firstly the air line valve 24 and then after a short period of time open the filtrate line valve 20. Then, the normal filtering operation will be resumed. However, a suitable timer means may be provided in the controller circuit so as to regulate the duration of the blowing operation. Usually, the controller 22 is caused to continue the blowing operation for a short period of time, such as from one to three seconds.

As described hereinabove, since the screen element 8 is doubly protected from dirt and foreign matter, that is, washed constantly by means of the flowing fluid and in addition blown off automatically by means of the air under pressure if clogged, it will cause the fluid to be filtered positively at all times in the strainer according to the present invention. Accordingly, there will be no need of opening the strainer for the purpose of cleaning. In actual instances, a ship of about 3000 t. (deadweight tonnage) equipped with the strainer according to this invention navigated for about three months without requiring opening of the strainer from the time when it was first installed.

Also, due to the reliable operation of the strainer according to the present invention, a centrifugal purifier will not be needed except for removing water content from the oil.

What is claimed is:

1. A strainer for filtering fluid comprising housing means provided with fluid supply, fluid discharge and filtrate delivery conduits respectively, filter means connected to said delivery conduit and accommodated within said housing means and including a screening element of cylindrical shape and a guide member surrounding said screening element and having guide vanes disposed thereon and positioned to induce a helical flow of fluid around said screening element, thereby causing at least one portion of the fluid supplied into the strainer to be moved around said screening element, and pneumatic blowing means connected to said fluid supply and filtrate delivery conduits and automatically operated by a pressure differential between said fluid supply and said filtrate delivery conduits for cleaning said filter means.

2. A strainer as described in claim 1, comprising a fluid reservoir connected to said fluid discharge conduit to receive the portion of said fluid which has flowed around said screening element and also connected to said fluid supply conduit, thereby forming a fluid circuit from said reservoir through said fluid supply conduit, the strainer, and said fluid discharge conduit again to said reservoir, with the other portion of fluid being caused to pass through said screening element.

3. A strainer as described in claim 1, wherein a space between said screening element and said guide member is axially divided into a plurality of sections, each of which is provided with at least one inlet and outlet opening respectively.

4. A strainer as described in claim 3, wherein said guide member has an inwardly extending helical guide vane defining a helical passage for the fluid in each of said sections.

5. A strainer as described in claim 1, wherein a branch conduit is divided from said filtrate delivery conduit so as to supply air under pressure into said screening element.

6. A strainer as described in claim 1 comprising an electromagnetic valve on each of said filtrate delivery conduit and said branch conduit for air under pressure, a controller for said electromagnetic valves, and a pressure differential switch having a diaphragm adapted to be actuated by a pressure differential between said fluid supply and said filtrate delivery conduits and connected to each of said fluid supply and said filtrate delivery conduits so as to close an electric circuit through said controller when said pressure differential attains a predetermined value, said controller being operated to close first said electromagnetic valve on said filtrate delivery conduit, and then after a predetermined period of time open said electromagnetic valve on said branch conduit for the air under pressure when said electric circuit is closed so as to supply said air under pressure into the screening element.

7. A strainer as described in claim 6, comprising timer means connected with said controller to control the duration of the blowing operation of the pneumatic pressure pipe line.

References Cited

UNITED STATES PATENTS

| | | | |
|---|---|---|---|
| 605,087 | 6/1898 | Davidsen | 210—433 X |
| 894,414 | 7/1908 | White | 210—433 X |
| 2,053,856 | 9/1936 | Weidenbacker | 210—433 X |
| 2,569,748 | 10/1951 | De Grave | 210—108 |
| 3,043,431 | 7/1962 | Dudley et al. | 210—433 X |

JOHN W. ADEE, Primary Examiner

U.S. Cl. X.R.
210—138, 195, 433